United States Patent [19]

Bottesch

[11] Patent Number: 5,276,620
[45] Date of Patent: Jan. 4, 1994

[54] AUTOMATIC COUNTERSTEERING SYSTEM FOR MOTOR VEHICLES

[76] Inventor: H. Werner Bottesch, R.D. #6, Box 374, Danville, Pa. 17821

[21] Appl. No.: 673,982

[22] Filed: Mar. 25, 1991

[51] Int. Cl.⁵ .............................................. B62D 6/04
[52] U.S. Cl. ................................ 364/424.05; 180/142; 180/140
[58] Field of Search ...................... 364/424.01, 424.05, 364/426.02; 180/140, 142; 280/91

[56] References Cited

U.S. PATENT DOCUMENTS

| | | | |
|---|---|---|---|
| 4,967,865 | 11/1990 | Schindler | 180/79.1 |
| 5,019,982 | 5/1991 | Furukawa | 364/424.05 |
| 5,078,226 | 1/1992 | Inagaki et al. | 180/141 |
| 5,089,967 | 2/1992 | Haseda et al. | 364/426.02 |
| 5,092,624 | 3/1992 | Fukuyama et al. | 280/707 |
| 5,103,925 | 4/1992 | Imaseki et al. | 180/140 |
| 5,121,322 | 6/1992 | Shiraishi et al. | 364/424.05 |
| 5,122,955 | 6/1992 | Ishikawa et al. | 364/424.05 |
| 5,136,507 | 8/1992 | Shiraishi et al. | 364/424.05 |

*Primary Examiner*—Vincent N. Trans
*Attorney, Agent, or Firm*—Bernard A. Chiama

[57] ABSTRACT

A countersteering system is disclosed for a road vehicle including sensors arranged to sense the speed of steerable wheels in response to changes in road surface texture, the lateral movement of the wheels in response to skid movement, and the rotational motion of the steering wheel for the vehicle, and to produce respective signals according therewith. A control system is devised to receive these signals and to produce a control signal in accordance therewith as a corrective routine and to impress this control signal in a force producing mechanism to impart movement of the steerable wheels for corrective purposes. The control system is devised to differentiate time lags between occurrances of repetitive sequences of at least one of the signal in its production of the control signal.

13 Claims, 3 Drawing Sheets

PRE-SKID WHEEL ANGLE

WHEEL ANGLE AT INSTANT OF SKID

SEQUENCE #1

SEQUENCE #2

SEQUENCE #3

SEQUENCE #4

SEQUENCE #5

SEQUENCE #6

SEQUENCE #7

FIG. 3

AUTOMATIC COUNTERSTEERING SYSTEM FOR MOTOR VEHICLES

BACKGROUND OF THE INVENTION

This invention relates in general to automotive power steering systems and in particular, to a computer-assisted interaction between the vehicle operator, the vehicle and the road surfaces.

Functionally, this system, hereinafter referred to as the ACS System, can do for power steering systems of the present art what the anti-lock braking system has done for hydraulic braking systems of that prior art in relation to the maintaining of vehicular control and safety. With regard to power steering systems of the prior art, there has been little done to coerce direct contribution to overall vehicle safety from them, except as relates to mechanical steering function. The substance of the invention disclosed herein allows for such a contribution, the need for which will become more obvious on further examination of the present disclosure.

SUMMARY OF THE INVENTION

In principle, the ACS System is comprised of a combination of electronically operated, electrically driven hydraulic valving components, at least one hydraulic pump, hydraulic piston or servo mechanism, electronic sensors and computer components arranged in such a fashion so as to correct erroneous steering fluctuations originating from road surface irregularities and to have the ability to distinguish between said fluctuations and those originating with the vehicle's operator in the course of normal steering activity. This is accomplished at computer level by sensor input differentiation between the steering wheel motion/position detecting sensor(s) input and the input from the wheel motion/position detecting sensors. The computer is programmed to maintain a state wherein it continuously monitors wheel positions of the wheels involved in steering, and uses this information to prompt the repositioning of said wheels to their pre-deviational state once the need for steering correction has been determined, said determination having been made via sensor input differentiation.

It is my intent via the present invention, to provide a useful device to help correct some of the steering errors brought about by operator neglect and misjudgement, thereby decreasing the likelihood of certain types of automotive accidents and the suffering and expenses associated therewith.

BRIEF DESCRIPTION OF THE PREFERRED EMBODIMENTS

I, H. Werner Bottesch do hereby disclose my invention of an automatic countersteering device for motor vehicles hereinafter referred to as the ACS System. The following disclosure details the description of a preferred embodiment of this invention. This embodiment is comprised of a device which has the capability of distinguishing between changes in road surface texture (as, for example when the right front wheel of the vehicle begins to make contact with the shoulder adjacent to a road's surface) for the purpose of automatically countersteering the vehicle back onto said road surface.

With regard to the ACS System, the following principles apply, not necessarily in the order listed:

Inconsistencies in road surface texture, especially with regard to (while not being limited to) the border areas at the shoulder, may cause changes in the lateral motion of either and eventually both front wheels, as for example, when the vehicle's front right wheel begins to contact the shoulder portion of the road surface. This contact will pull the wheel in the direction of the shoulder.

Figure 2:
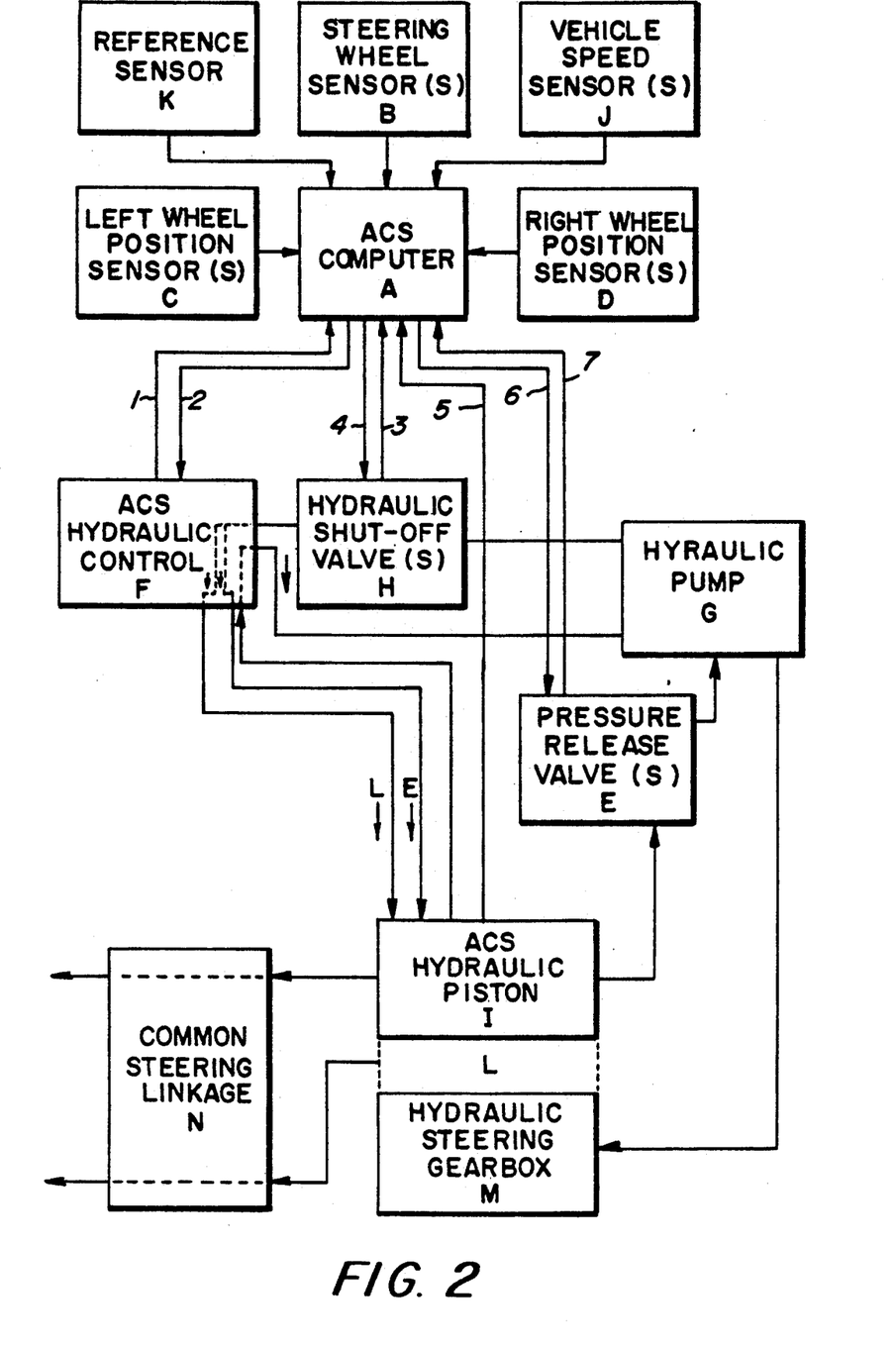
FIG. 2 is a block diagram of a countersteering system in accordance with the present invention.

The physical forces involved in such lateral wheel motion are mechanically transferred from the affected wheel to the steering linkage, N, FIG. 2, power steering hydraulic piston (L, FIG. 2), other wheel, steering gearbox, M, FIG. 2, and steering wheel.

Because of the nature of the physical construction of the steering mechanism, the forces involved in lateral front wheel motion with respect to changes in road surface texture are mechanically transferred unevenly (especially with respect to time) from said wheel(s) through the linkage, etc., said forces eventually resulting in steering wheel movement.

The small lag in time, between the moment when a wheel-proximate motion and/or position detecting sensor, C, D, FIG. 2 (also referred to in this disclosure as a motion/position sensor) detects lateral wheel movement in response to a change in road surface texture and the time that such motion physically reaches and may be detected by the steering wheel motion/position sensor (B, FIG. 2), can be effectively used to differentiate, at computer level, between motion originating from road surface texture changes and motion originating from driver contact with the steering wheel. This lag in time may similarly be measured at or in proximity to any point in the steering mechanism where it can be observed and detected, other than at its location as illustrated and described in the present embodiment. Such usage is to be included within the scope and intent of this invention.

For purposes of expediency in relation to this disclosure it is assumed that analog or other non-digital sensor signals are digitized, prior to being input into the computer, via means presently known in the art, although no specific reference to such digitization has been made.

With regard to the time differentiation factor as it relates to the various individual sensor inputs, the signals from a continuously running, computer-resident, or computer-accessible electronic clock device are utilized as time references. The computer converts each incoming sensor input into a numerical value representing that input. It also associates each of these sensor input-derived numerical values with an additional numerical value representing its time of origin (or approximate time of origin). Therefore, each of the resulting values is coded to contain information representing a particular wheel or steering wheel position, as occupied during a specific interval of time.

The computer is programmed to identify the time-relevant portions of the aforementioned coded values and, on that basis, sorts said coded values and assemble them in the order of their occurrence with relation to time, said product of such assembly being referred to hereinafter as a time-ordered sensor input sequence. The computer is configured and programmed to monitor such sequences and to compare the individual inputs comprising such sequences to each other with respect to their individual positions within the sequence.

This comparison enables the computer to determine whether or not a given wheel sensor signal input has preceded a steering wheel sensor signal input, and thereby enables it to determine whether the origin of the lateral wheel motion is due to a change in road surface texture or due to the operator's contact with the vehicle's steering wheel. The aforementioned procedures, by which the computer determines the order of input of the various sensors and establishes the precedence of one sensor signal over another with respect to time, are referred to in this disclosure as sensor input differentiation. The computer is also programmed to interpret two or more of the aforementioned coded values having identical time values, as errors, and to thereby exclude such values from being utilized in sensor input differentiation.

It would seen that, with regard to sensor input differentiation, the uncomplicated assemblage of logic elements proper, would of itself be useable in determining the precedence of one signal over another, the exclusion of one signal in relation to another, etc., etc. However, because of the continuous flow of sensor inputs during vehicular motion, a prudent way to reconcile their significance with respect to one other, would be to associate each of the individual sensor inputs with their respective times of origin. Not only must the various sensor inputs' significance with respect to one another be reconciled, but they must also be reconciled with respect to the real conditions encountered during the vehicle's course of travel, it the effects of said encountered conditions are to be dealt with on an automated level.

The use of logic elements in conjunction with clock and sensor inputs is well established in prior art and although not specifically referred to or illustrated in this embodiment of this invention, their potential use, in constructing a functionally simplified alternative to the processing procedures for sensor input differentiation as cited above, is acknowledged and such construction and usage is to be included within the scope and intent of this disclosure.

The computer is programmed to use sensor input differentiation as a means for it to appropriately prompt the execution of its resident steering and/or skid correction routines. These routines, in turn, enable it to direct a series of hydraulically powered counter-movements of the wheels involved in steering, in response to changes in road surface texture. The computer's control over said hydraulically powered countermovements is accomplished via its interface with electronically controlled, electrically driven hydraulic valve components as are presently known in the art.

It should be pointed out that the sensor inputs are split so that the same signal from a sensor may be used in both sensor input differentiation as well as being loaded into memory as a potential reference for correcting wheel positions.

A standard buffer memory (such as is used in, for example, a computer printer) fills to a certain predefined capacity before outputting data, or offers a potentially variable, but time-irrelevant delay before said data is output. However, a time-relevant, variable buffer memory, as used in the ACS disclosure, is comprised of a number of data storage sectors (which may consist of conventional means for buffer storage, such as RAM), each of predefined capacity and arranged so that the incoming sensor input is sequentially transferred from sector-to-sector, said input being delayed for a predetermined interval of time at each sector as transfer occurs, thereby offering a variable delay in the time of data output and a means of accessing data specifically pertaining to a wheel's former lateral position, in relation to time and/or the vehicular distance travelled between former and current wheel positions. From which sector the data is output, is defined by the ACS computer in relation to vehicular speed. Sensor data may be loaded into a separate variable buffer memory for separate access, or into a variable buffer memory configured to accept several different inputs and allow the separate access of these various inputs.

For purposes of illustration, a variable buffer memory is configured to contain 10 distinct data storage sectors through which the incoming WC data are transferred in a linear fashion. It takes each sector of memory, as defined by its capacity, e.g. 0.001 th of a second to fill with incoming WC data. As the WC data enters the variable buffer memory, it is delayed being transferred by 0.001 second per sector for a total of 0.01 second (representing total buffer capacity). Thus, the data output at sector #10 is delayed by 0.01 second during the ACS System's passive mode of operation. Each next lower sector can, when accessed, output data 0.001 second sooner than the previous one. As the vehicle's speed increases, the computer, having been configured and programmed to be able to do so, has the capability of extracting data from any of the individual sectors in decreasing order to increasing vehicular speed.

This enables the computer to potentially extract data pertaining to a former wheel position, which is both relevant to vehicular speed and to the distance that said vehicle travelled between the former wheel position and the current wheel position. This allows for the potential standardization and optimization of the distance travelled between said wheel positions for any increment of speed within the defined range of speed within which said vehicle is capable of travelling, and allows the electronics portion of the ACS System to be regulated to conform to the actual, physical response-time limitations of the mechanical portion of said system. Once the computer has identified a steering correction task, it extracts the former wheel position data (WP) from the sector appropriate for the vehicle's present speed and/or distance travelled.

The length of time of retention of said data in said buffer memory is adjustable by the computer in relation to current, incoming data from a telemetry device, such as the vehicle's speed sensor, J, FIG. 2. The system's response time and buffer access time may also be thus modified, according to vehicular speed.

WP(L) = wheel position data (derived from C, FIG. 2.) representing the left front wheel's former lateral position during its transferal through the individual sectors comprising said variable buffer memory, said data having the potential to have its access delayed by a specified length of time corresponding to the time of delay offered by the particular sector of variable buffer memory being accessed, said data therefore representing the left wheel's position prior to an onset of change in that wheel's position, as brought on by a change in road surface texture WP(R)=wheel position data (derived from D, FIG. 2.) representing the right front wheel's former lateral position during its transferal through the individual sectors comprising said variable buffer memory, said data having the potential to have its access delayed by a specified length of time corresponding to the time of delay offered by the particular sector of variable buffer memory being accessed, said data therefore representing the right wheel's position prior to an onset of change in that wheel's position, as brought on by a change in road surface texture WC(L)=current incoming wheel position sensor input from component C, FIG. 2.

WC(R)=current incoming wheel position sensor input from component D, FIG. 2.

Thus, each incoming sensor signal is used to derive separate sets of data. It should also be noted that the WP and or WC values can be comprised of wheel position data in combination with the respective time values of occurence of said data, as previously discussed.

The computer is programmed to continually load the input from each individual wheel motion/position sensor (C,D, FIG. 2.) into its own variable buffer memory. The sensor data will be temporarily retained in said variable buffer memory, for potential use by the system's computer, A, FIG. 2., as a reference in the steering correction process. The data from each of these sensors is retained from a relatively short, predetermined interval of time as it transfers through the storage sectors of the computer-addressable, variable buffer memory in response to the continuous input of current wheel position data into said variable buffer memory.

The computer will be programmed to monitor and compare the current, incoming wheel position data (WC) to the aforementioned, extracted, former wheel position reference data (WP) while it is engaging in actively controlling the hydraulic system during wheel position correction. The WC values will change in relation to the computer-controlled hydraulic wheel movements. The computer will also be programmed to abort its control of the hydraulic portion of the system once the WC values equal or slightly exceed the WP values, thereby enabling said computer to correct or slightly overcorrect the wheel position to a value equal to or slightly greater than that of the wheel's former position prior to having encountered the road surface texture deviation, and thereby effectively correcting the wheel position and potentially correcting the steering disturbance or error caused by an inattentive vehicle operator.

In contrast, any steering wheel motion resulting from operator contact with the steering wheel will result in signal input from the steering wheel motion/position sensor(s) B, FIG. 2), said input preceding the input (WC) from the left and/or right wheel motion/position sensors (with respect to time) as the front wheels mechanically respond to the operator's turning of said steering wheel during normal steering activity. The computer is programmed to interpret such signals as errors, thereby preventing erroneous actuation of automatic counter-steering measures in response to motions originating at the steering wheel.

Figure 1:
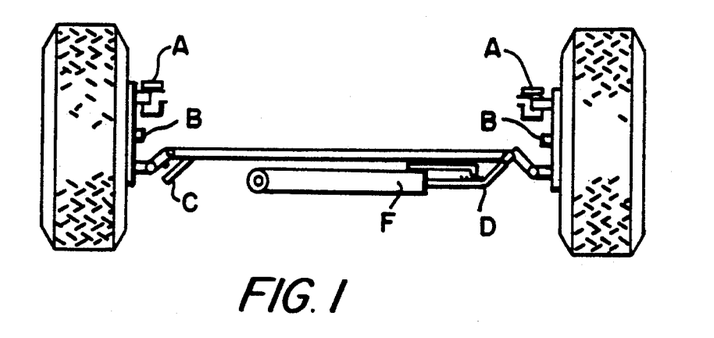
FIG. 1 is a schematic illustration of the front steerable wheels of a road vehicle showing typical placements of sensing devices in accordance to the invention.

The determining factor in the ability of the ACS System to distinguish between operator-initiated steering fluctuations and those originating from road surface irregularities lies in the computer's programmed interpretation of the interplay between sensor inputs from one or more steering wheel motion/position sensors (B, FIG. 2) and the individual front wheel motion/position sensors (C,D, FIG. 2) possible locations of which are shown at A-F, FIG. 1, the preferred wheel sensor location(s) for this embodiment being at A, FIG. 1. Inputs from these sensors are monitored by a computer which has been programmed to compare current sensor input (WC) from the individual wheel motion/position sensors to the sensor input from the steering wheel motion/position sensor(s) (with relation to time) using a time differentiation factor between said sensor input times to determine the origin of said steering fluctuations.

Therefore, with relation to time, if the wheel motion/position sensor(s) responds before the steering wheel motion/position sensor(s), then the steering fluctuation is identified by the computer as originating from an irregularity in the road surface texture, rather than originating from the vehicle's operator. If, on the other hand, the steering wheel motion/position sensor responds before the wheel motion/position sensor(s) does, then the steering fluctuation is interpreted by the computer as originating from the vehicle's operator and therefore, no countersteering measures are prompted by said computer. The computer is programmed to carry out this differentiation on a continual basis and this will effectively enable it to distinguish between driver-initiated steering movements and wheel movements originating from road surface irregularities.

Through the use of computer programming techniques as are well established in prior art, the computer is to be programmed to monitor steering wheel and individual front wheel positions from moment-to-moment and to prompt the hydraulic portion of the system to correct the wheel position to its former position in the event that a road surface irregularity of sufficient size and duration to alter wheel position is encountered. Once the former wheel position is regained, as indicated by the consequent wheel sensor feedback, the computer will effect the relinquishment of steering control to the vehicle's operator and await the next change in road surface texture.

The sensing, computations, corrective actions and relinquishment of steering control to the operator shall be of such speed that said operator should barely perceive any change in his/her control over the steering wheel.

Sufficient sensory and data feedback mechanisms can be incorporated into the system so as to allow for override in the event of failure of any of the components, thereby preventing the operator of the vehicle from losing steering control as a result of system failure. Some of these will be discussed later.

It should be noted that minor lateral wheel vibrations are normally encountered when the vehicle is in motion and that these vibrations may be accounted for, and their effects on ACS System performance negated by several means. For example, the computer may be programmed to interpret the incoming wheel position data in ranges of increments rather than in precise, individual increments, said ranges being intentionally defined to encompass the aforementioned minor lateral wheel vibrations, thereby negating their adverse effects on system functions. The use of so-called "fuzzy logic" in making these and other such interpretive calculations is also to be included within the scope and intent of this invention. Another variation may be made, by altering the configuration of the lateral-motion/position-detecting wheel sensor itself so as to make it generate broader wheel position signals which will, of themselves, encompass the aforementioned minor lateral wheel vibrations, again negating their adverse effects.

There are a number of devices which exist in prior art, and which may be adaptable as sensors to detect lateral wheel motion and/or position and the use of any such device to detect lateral wheel motion and/or position in relation to steering and or skid correction-related processes is intended to be included within the scope and intent of this invention. For example, a simple rheostat could be so employed, if it were weatherproofed, stationarily anchored, mechanically linked to the wheel and functionally dependent on lateral wheel motion to change its resistance. Another example would comprise a magnet and an opposing coil (FIG. 4), or two opposing coils-one stationary, the other attached to a laterally moving portion of the wheel. These magnets and/or coils would be mounted facing one another and would produce detectable changes in magnetic field resulting from any lateral wheel movements.

A magnetic flux gate sensor may be attached to each wheel (locations for which are illustrated at B, FIG. 1.) and utilized in the following manner: the computer uses sensor input differentiation in its comparison of these wheel sensor inputs with those of a steering wheel motion/position sensor (B, FIG. 2), or with the input from another, separately located magnetic flux gate reference sensor (K, FIG. 2.). The input from this reference sensor may also be functionally used in place of the input from said steering wheel motion/position sensor in the computer's application of sensor input differentiation to the incoming sensor signals. This makes it possible to establish an order of sensor inputs with respect to time, the methods for, and significance of which, have been previously cited.

An additional benefit may be extracted from this embodiment in that the computer may also be programmed to detect a lateral degradation or loss of tire-to-road adhesion, as would occur under certain driving scenarios, such as when a vehicle traveling in a curve loses traction and begins to skid tangentially to the intended direction of travel, as might occur on a slippery or icy road surface.

It should be noted that during the onset of a skid, the wheel will move laterally in the opposite direction to that which occurs when said wheel contacts the road shoulder surface.

Skid detection may be accomplished by virtue of sensor input differentiation, but with variations. For example, a wheel mounted flux gate sensor may show a lag in response time by virtue of its being mounted in close proximity to a relatively large mass of steel, namely, the wheel mount. The reference sensor may be mounted in a lesser proximity to a mass of steel (e.g. within a non-magnetic [e.g. plastic] rear-view mirror assembly within the vehicle), to make it more responsive than its wheel sensor counterpart, implying that there may be a sensor response differential which may have to be accounted for, e.g. by calibration of the sensors. In any case, the wheel mounted flux gate sensor would still respond to a change in lateral wheel movement, and its input would still precede that of the flux gate reference sensor, allowing the computer to apply sensor input differentiation in determining the origin of said wheel movement. It would seem that the inputs from a wheel mounted flux gate sensor would not be significant with respect to recording previous wheel positions because of the continuous changes in the detected magnetic field resulting from changes in the direction of travel of the vehicle, and therefore, these inputs could not be utilized in steering or skid corrections per se. Changes in the direction of travel of a vehicle can occur even when the position of the wheels remains constant. However, these inputs, as such, may still be utilized by the computer to identify steering correction and skid correction tasks, via sensor input differentiation.

It may, however, be possible to utilize the aforementioned flux gate sensor inputs in achieving steering correction, by taking advantage of the directionally significant nature of said inputs while using them as a reference for correction in the effecting of the wheel's directional correction, as opposed to the wheel's positional correction as has been previously discussed in this disclosure. Such application is intended to fall within the scope and intent of this invention.

Since the direction of travel of a moving vehicle changes from moment to moment, the computer can be programmed to monitor individual sensor inputs for change, in relation to one another, both with respect to changes in direction (which will influence both the wheel and the reference sensors) and with respect to the order of sensor input during said changes in direction of travel of said vehicle. The inputs from the individual wheel sensors would again be subject to sensor input differentiation and would be processed as previously described, in that regard. Currently occurring wheel sensor inputs are again stored in variable buffer memory, but are indicative of previous directions of travel rather than former wheel positions. As such, they could be utilized as references for correction, the methods for the above cited processes paralleling those previously cited.

With regard to the use of magnetic flux gate sensors, when a vehicle engages a left curve, for example, the resulting wheel sensor inputs would be monitored in at least two ways, not necessarily in the order listed: in relation to steering wheel sensor and/or magnetic flux gate reference sensor inputs, and in relation to temporarily stored, directional reference data.

The computer is programmed to compare incoming wheel sensor data to previously input data from the same sensor while monitoring the incremental change in direction indicated by said data, during said curve engagement as well as during straight-line vehicular travel. During said monitoring, the computer is also programmed to detect abrupt, brief reversals in direction and to interpret these reversals as indicative of either a skid correction task or as a steering correction task. Sensor input differentiation would be used to determine the origin of said reversals in a manner which parallels methods previously cited.

This would permit the identification of steering and skid correction tasks as well as the actual steering and skid corrections themselves, without the need to determine precise wheel positions which would otherwise be required in order to to effect the necessary wheel position corrections. The use of flux gate sensors in combination with other sensors cited in this disclosure, for purposes of regulating steering and/or skid detection and correction processes is intended to be within the scope and intent of the present invention.

It is believed that the skid detection, correction and prevention processes function as described herein. The following description pertains to the system's use of singular sensors and components and is thus offered to simplify an understanding of the underlying concepts. The use of additional sensors and components is intended to be included within the scope and intent of this invention.

Figure 4:
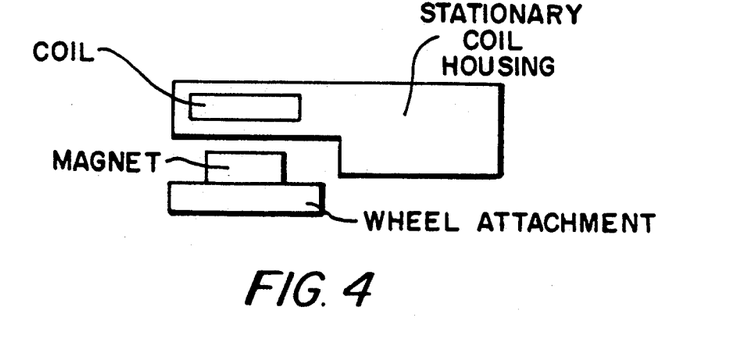
FIGS. 4a and 4b are illustration of typical sensor construction and placement in accordance with the invention.
Figure 5:
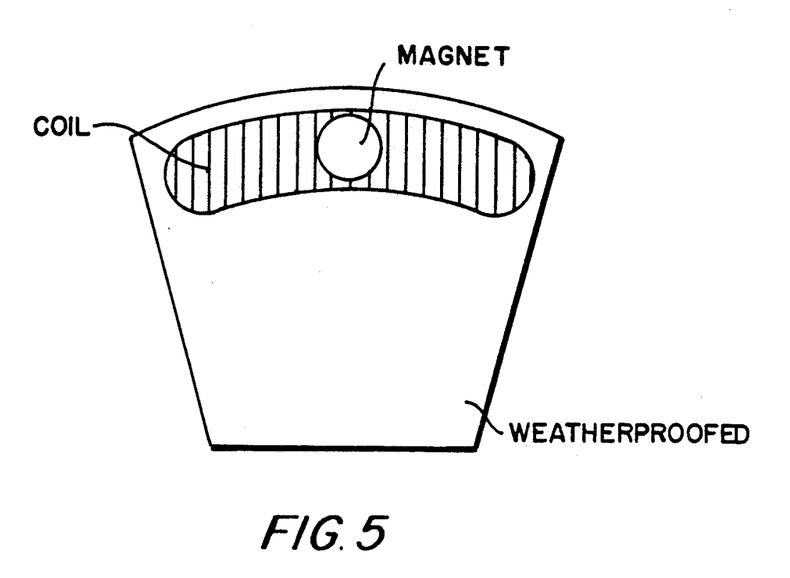

For purposes of this illustration, the system computer uses input from a right front wheel motion/position sensor (D, FIG. 2.; FIG. 4.), located at position B, FIG. 1., a steering wheel motion/position sensor (B, FIG. 2.) and a vehicle speed sensor (J, FIG. 2.). This is not to imply that the left front wheel is neither involved in steering nor sensor equipped.

The wheel motion/position sensor, D, FIG. 2., is configured to have a specific range of detection with regard to the vehicle's lateral, front-wheel movements. The wheel sensor D, FIG. 2., detects lateral wheel movements in increments, thereby supplying the computer with current input which is relevant to a specific increment of wheel position, per unit of time. The computer, A, FIG. 2., is programmed to identify, by its input, any known increment of lateral wheel movement falling within said range of detection of wheel sensor D, FIG. 2. Those wheel sensor inputs which signify a straight wheel position, wherein the wheel is parallel to, or approximately parallel to the length of the vehicle's body (WN input), may lie, for example, midway in the sensor's range of detection, and may be empirically determined, for example, by definition and/or through calibration of said wheel sensor. Once the values for this potential WN input are known, the computer can be programmed, using methods which are firmly established in the art, to detect and identify said WN input when it occurs, and thereby, to identify when the vehicle is traveling in a straight or approximately straight line.

Likewise, those wheel sensor inputs which signify wheel positions to the left and right of said straight wheel position may also be empirically determined. Once all of these values are known, the computer can be programmed to utilize them in its detection and identification of any input falling within the range of detection of said wheel sensor, and can thereby determine the position of the wheel at any given time.

As a further refinement of this, the input for a specific increment of wheel position, occuring during vehicular engagement of a curve in the roadway, may be correlated, via a computer program written for that purpose, to one or more specific minutes-of-angle of said curve.

It therefore becomes possible for the computer to be programmed to associate a specific wheel position increment with one or more specific minutes-of-angle directly relevant to a curve in the roadway, and do so while said curve is being negotiated by said vehicle. Furthermore, it also becomes possible for the computer to potentially utilize these data to actively regulate the physical system responses in direct relation to the angle of an encountered curve. Thus, the physical system responses can be regulated proportionally to the changes in the minute-of-angle of the encountered curve as well as to vehicular speed. The more extreme the vehicular speed and/or the minute-of-angle of said curve are, the faster and the longer the duration of the physical system responses can be. Variable buffer memory is used to that end in a manner similar to that employed in the steering correction processes of this disclosure. It is also acknowledged that said system responses may be regulated in proportion to either, rather than a combination of both changes in said minute-of-angle and vehicular speed.

The variable buffer memory may be used in several ways, in relation to skid detection and correction. Inputs related to wheel position may be loaded into a variable buffer memory and accessed according to vehicular speed, as discussed in this disclosure. The data related to the calculated minute-of-angle of a curve being negotiated may be loaded into a separate variable buffer memory for separate access, or into a variable buffer memory configured to accept several different inputs and allow the separate access of these various inputs. A separate, variable buffer memory may be loaded with currently generated skid probability factors which will be accessed by the computer, for the purpose of regulating the duration and degree of physical system responses. This variable buffer memory shall be loaded at the same rate and accessed in tandem with the variable buffer memory which contains wheel position data. A higher vehicular speed, combined with a sharper curve angle may require a larger number of finer, more subtle corrective movements (FIG. 3), while a lower vehicular speed combined with a less pronounced curve angle may require a smaller number of coarser corrective movements.

In another variation on this theme, the data related to the calculated minute-of-angle of a curve may be utilized by the computer, in association with data related to the wheel position and vehicular speed, etc., in the calculation of abstract mathematical values which would represent the combined attributes of one or more of the various inputs and/or data being utilized in said calculation. These abstract values may then be loaded into a variable buffer memory as they are generated, and accessed as discussed elsewhere in this disclosure, and may otherwise be manipulated to control ACS System responses in relation to encountered road conditions and vehicle status.

An additional aspect of skid detection may include the defining of specific criteria with regard to vehicular speed, weight, degree of road curvature, outside air temperature, etc., which can be used by the computer in establishing a degree of skid risk, in determining whether or not the skid detection/correction options are to be addressed, and, more importantly, in prompting skid prevention measures. The computer may be programmed to generate such skid probability factors in relation to the incoming sensor inputs and compare these to an established database comprising a series of such pre-determined values, as per the following, oversimplified example: for a vehicle traveling at 56 MPH while engaging a 60 degree left curve, a simple, but relevant skid probability factor could be obtained by the computer's multiplying of the speed by the number of degrees in the angle of the curve $$56 \times 60 = \text{a skid factor of } 3360.$$

If the same vehicle enters the same curve at 20 MPH, the skid probability factor thus generated would be $$20 \times 60 = 1200.$$

A database of such values, for a variety of combinations of speeds and curve angles, can be assembled and loaded into the computer, for use as a reference to which the actively generated skid probability factors may be compared as they occur. Certain of the values within this database will be indicative of a higher degree of skid probability than others. These higher values may be empirically determined and/or abstractly calculated, and then flagged and used by the computer as a means for it to address its skid detection/correction program options, as well as to ultimately regulate vehicular speed, ABS braking system actuation, operator-proximate skid-danger warning devices etc., in order to possibly prevent a skid from occuring in the first place. A skid is more likely to occur, for example, at a value of 3360 than it is at a value of only 1200. Those database values which correspond to driving conditions under which there is substantial risk for skidding to occur are flagged, for eventual use by the computer in evaluating current skid probability factors as they are generated. Therefore, when a current skid probability factor of eg. 3360 is generated and compared to its flagged database counterpart, the computer, having been programmed to generate said skid probability factors, make said comparisons and prompt one or more responses in reaction to those comparisons, runs its resident routine(s) appropriate to the correction or possible prevention of a potentially dangerous skid. Computer intervention may be comprised of its prompting of a downward revision of the vehicle's speed, via electronic interface with the vehicle's engine computer, automated throttle control, interaction between the computer, the speed sensor and the vehicle's anti-lock braking system to downwardly revise vehicular speed, the spraying of a friction producing chemical compound onto the tire tread surfaces, etc.

As described elsewhere in this disclosure, the input from the right wheel motion/position sensor D, FIG. 2., can be used by the system computer to determine whether, at any given point in time, the vehicle is traveling in a straight line or engaging a curve. Thus, when the computer determines that the vehicle is engaging a curve, its program options, with regard to skid detection and correction, become addressable. Therefore, as the vehicle enters said curve, the computer's monitoring and correlation of the wheel motion/position and steering wheel motion/position sensor inputs becomes relevant to both skid detection/correction and steering correction tasks. This is not to say that the program options for skid detection/correction cannot be designed to be continuously addressable or addressable at other times. Sensor input differentiation again comes into play here.

The wheel sensor input resulting from said leftward movement of the right wheel during the onset of a skid, is a consequence of said degradation of friction. This input precedes the input from the steering wheel motion/position sensor, B, FIG. 2., and is also identifiably different (by virtue of it's positional characteristics) from that which would result from a typically rightward wheel movement occuring during unintentional right wheel contact with the road's shoulder, whether or not the vehicle is negotiating a curve. This positionally significant difference in potential wheel sensor inputs (as derived via the computer's comparison of current wheel sensor input to the immediately previous wheel sensor input) enables the computer to be able to distinguish between a skid correction task and a steering correction task, while the sensor input differential, between the right wheel sensor input and the steering wheel sensor input, enables the computer to identify a skid correction task, as a prelude to correction.

Therefore, when said left curve is engaged and a skid begins, the computer, having been programmed to be able to do so, identifies said leftward-indicating wheel sensor input as a skid correction task and initiates the appropriate skid correction routine(s).

In the following scenario, an ACS System equipped vehicle is traveling in a straight line, approaching a 60 degree left curve at, for example, 56 MPH. The aforementioned sensors, B, D, and J, FIG. 2., supply input to the system computer, A, FIG. 2., on a continuous basis, said sensor inputs being used by the computer in several ways, to facilitate skid detection and correction.

The computer, having been programmed to interpret the significance of wheel sensor input with regard to wheel position, continuously monitors wheel position data and loads these data into a variable buffer memory for future use as a correction reference. As the vehicle approaches the left curve, the wheel sensor, D, FIG. 2., supplies current wheel position input to the computer, A, FIG. 2., (said data, in this instance, being comprised of WN values), indicating that the vehicle is traveling in a straight line. As the vehicle engages the left curve, the centrifugal forces acting on said vehicle tend to drive the wheels laterally in a rightward direction in opposition to the steering-related frictional forces (between tire and road surfaces) which tend to hold the vehicle in position on the curve.

Figure 3:
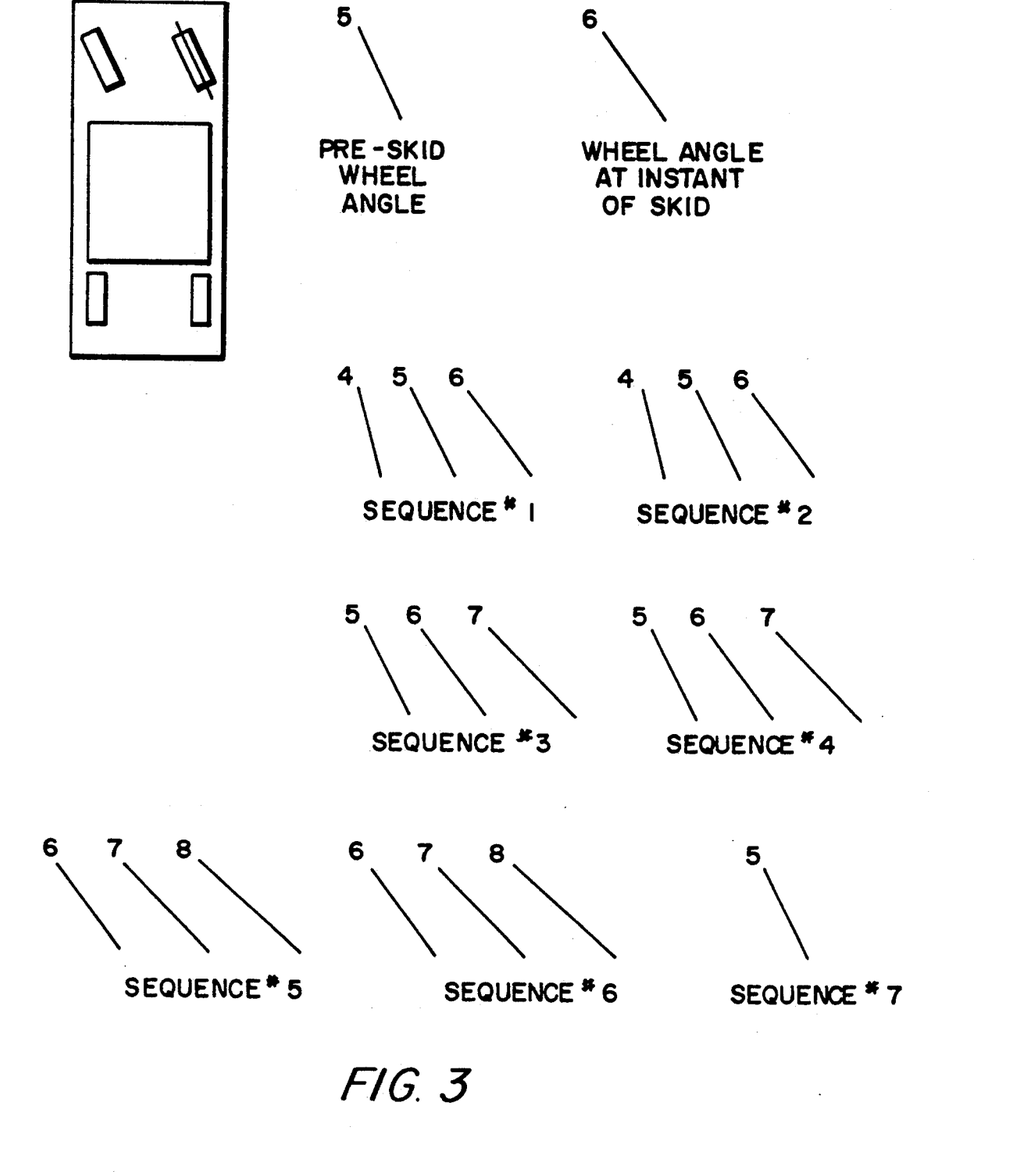
FIG. 3 is a series of sequences of wheel movements in a countersteering application of the invention.

When the tire-to-road-surface friction degrades during the onset of a skid, the wheel moves from its pre-skid position (position #5, FIG. 3.), leftward, in the direction of the curve (position #6, FIG. 3.). The input from this movement indicates a precise positional change with respect to the former lateral wheel position and also precedes the input from the steering wheel motion/position sensor, B, FIG. 2., therefore enabling the computer to identify said movement as a skid-in-progress. Depending on such factors as the sensitivity of the wheel motion/position sensor and the time interval employed by the computer in monitoring wheel sensor and steering wheel sensor inputs, the input resulting from this leftward movement may be detectable at computer level, even before a total degradation of said friction occurs, thereby enhancing the system's overall performance.

The former wheel position is extracted from the variable buffer memory in relation to vehicular speed and is used in a similar manner as in the steering correction application, as a reference for correction. One or more routines for governing skid corrective, hydraulically-assisted wheel movements is established via standard programming techniques as are known in the art. After said routine(s) are resident in the computer, they enable it to actuate the system's hydraulic controls as before, but enable it to prompt different sequences of corrective movements unique to the skid correction process. These movements are illustrated in FIG. 3. When a skid occurs while the right front wheel is in position #5, said wheel will briefly move to position #6, the input from which will precede the input from the steering wheel motion/position sensor and thereby indicate a skid correction task. The computer extracts the former wheel position data (for position #5) from the variable buffer memory as a reference for skid correction and runs one or more of the aforementioned, pre-established skid correction routines, thereby effecting the corrective hydraulic wheel movements in a series of sequences designed to recover steering control. An example of such a series of movements is offered in FIG. 3.

Thus, when the vehicle enters the curve, its right front wheel is at position #5. A skid begins, causing the wheel to move to position #6. The computer extracts the former wheel position from the variable buffer memories and runs its skid correction routine(s), while monitoring sensor input in relation to said former wheel position. The routine(s) actuates the system's hydraulic controls, thereby changing the positions of the wheel in rapid succession and in a sequence such as in the following illustration:

seq. #1=wheel is moved to positions 4, then 5, then 6, (in conjunction with seq. #1, the computer prompts the physical spraying of the tire tread surfaces with a friction-increasing chemical compound, such as one of those which have been commercially available and described in prior art, reduces engine speed via an interface with the engine's computer, prompts a braking sequence via interface with an anti-lock braking system computer, etc., as cited below), seq. #2=same as sequence #1, seq. #3=wheel is moved to positions 5, then 6, then 7, seq. #4=same as sequence #3, seq. #5=wheel is moved to positions 6, then 7, then 8, seq. #6=same as sequence #5, seq. #7=wheel is returned to pre-skid wheel position #5 via the computer's comparison of current wheel position input to former wheel position data as was extracted from said variable buffer memory. The system's intervention in steering then defaults to operator control. The above illustration is an example of one of a number of possible sequences and any such variations on this theme are to be included within the scope and intent of this invention.

Means for recovery of steering control in the skid correction process may include but are not limited to the following:

the computer may be programmed to prompt the spraying of a friction-increasing chemical compound (such as one of those which are, or have been commercially available) directly onto the tire tread surfaces using conventional means for spraying and for the actuation of such spraying, as are presently known in the art; or the computer may prompt rapid, repetitive and subtle steering correction movements in a similar manner as previously described, with the exception that the corrective steering movements for skid correction (as illustrated in FIG. 3.) may be directed first, slightly in the direction of the skid and then in the opposite direction, correcting or slightly overcorrecting the wheel position to it's former or approximately former (pre-skid) position, said corrective movements being rapidly repeated a number of times within a predesignated period of time and with slightly increasing angularity of wheel position, again dependent on vehicular speed in a similar manner as discussed in this disclosure; or the computer may, upon determining that a skid is in progress, prompt the participation of an anti-lock braking mechanism to reduce vehicular speed, and also may prompt a reduction in engine speed via the engine's computer, or combinations of any such means which could further contribute to the recovery of steering control.

The steering wheel motion/position sensor could be any device which would be capable of detecting the rotational motion of the steering wheel and/or it's axle and generating an electric or electronic signal in response to said motion. For example, a magnet and a coil, or two opposing coils—one stationary, the other attached to the steering wheel or it's axle, and mounted facing one another, would produce detectable changes in magnetic field resulting from any rotation of said steering wheel or it's axle. This effect is well known in the art, and a number of devices exist which utilize signals thus generated (e.g. the magnetic "sender" unit under the distributor cap of an automotive engine equipped with electronic ignition). A similar type of device could also be used as a wheel motion or position sensor through a minimal amount of mechanical adapting to that purpose as illustrated in FIG. 4.

For this embodiment, the steering wheel sensor may be comprised of a variation of the sensor illustrated in FIG. 4., modified to encompass the entire arc of the steering wheel and/or its axle.

The following is a detailed description of the flow chart of a preferred embodiment as illustrated in FIG. 2;

A=ACS System Computer, configured in association with a standard, quartz-driven clock device as known in the art and as is in common use B=Steering Wheel Motion/position Sensor(s)

C=Left Wheel Motion/Position Sensor(s)

D=Right Wheel Motion/Position Sensor(s)

E=ACS Hydraulic Piston's Pressure Release Valve(s), configured to remain open during the system's passive mode of operation, E being regulated by the computer via conductor(s) #6

F=ACS Hydraulic Control-containing one or more ACS piston pressurizing valves and one or more ACS piston fluid return valves, F being regulated by the computer via conductor(s) #2

G=Hydraulic Pump, which may represent a standard automotive power steering pump, or a separate hydraulic pump independent of said power steering pump and regulated independently by the computer, A H=Hydraulic Shut-Off Valve(s), regulated by the computer via conductor(s) #4

I=ACS Hydraulic Piston, freestanding or functionally integrated with component L J=Vehicle Speed Sensor(s)

K=Reference Sensor (dependent on type of wheel sensor used) e.g. a magnetic flux gate reference sensor may be used in association with magnetic flux gate lateral wheel motion sensors in its monitoring of the onset and direction of lateral wheel movement L=Hydraulic Power Steering Piston or Power Assist Mechanism M=Hydraulic Steering Gearbox, used to regulate component L N=Steering linkage (may be common to both the power steering mechanism and the ACS System)

1,3,5 and 7 represent conductors for status sensor signal inputs from status sensors monitoring components F, H, I and E respectively, although not necessarily representing or implying the order of sensor inputs.

The ACS Hydraulic Control (F) functions as follows: the piston pressurizing valve serves to pressurize the ACS Hydraulic Piston, component "I" in accordance with response requirements when the system is executing a steering correction task, and the fluid return valve serves to depressurize said piston via return flow to the power steering pump's intake when the ACS system is in a passive mode of operation, or when system failure prompts a complete shutdown. Each of the hydraulic valves may be independently controlled by the computer, A.

When the vehicle is in motion, the ACS computer continuously monitors data from the left wheel motion/position sensor(s) C,
right wheel motion/position sensor(s) D,
steering wheel motion/position sensor(s) B,
vehicle speed sensor J,
hydraulic control valve status sensor(s) monitoring component F, via conductor(s) #1
hydraulic shut-off valve status sensor(s) monitoring component H, via conductor(s) #3
ACS hydraulic piston pressure release valve status sensor(s) monitoring component E, via conductor(s) #7
ACS piston pressure status sensor(s) monitoring component I, via conductor(s) #5.

The ACS computer is programmed to monitor and temporarily retain data on wheel positions in a variable buffer memory from moment-to-moment, thereby providing a continuous potential source of varied WP values, said values each being delayed for a period of time appropriate to a particular range of vehicular speeds. These data are retained for the time interval needed to make a steering correction. The data thus accessed at a given time interval represents the WP value appropriate to that particular vehicle speed. The length of time of retention of these data in the variable buffer memory may therefore be correlated to the speed of the vehicle via speed sensor input and can be increased or decreased in relation to the vehicle's speed. This allows for a direct correlation of system response time to vehicular speed for the purpose of modifying system response times in relation to said vehicular speed as well as allowing the standardization and optimization of the vehicular distance travelled between former and current wheel positions.

The ACS computer, A, is programmed to utilize the wheel position data in several ways:

As previously described, the computer "A" compares the time values associated with each of the inputs from the steering wheel motion/position sensor(s) "B" with those of inputs from the individual wheel motion/position sensors "C" and "D". If either of the wheel motion/position sensor signal inputs precedes a steering wheel motion/position sensor signal input with respect to time, the computer is programmed to identify this occurence as a steering correction task and then runs the appropriate steering correction routine(s). Each wheel sensor's input is also significant with regard to the direction of the corrective movement, whether it be left or right of the previous position. If one example, input from component C would prompt the appropriate hydraulic valving at component F, resulting in a rightward corrective movement of the front wheels. Input from component D would promp the appropriate hydraulic valving at F, resulting in a leftward corrective movement of the front wheels. Identical, simultaneous wheel sensor signal inputs (within a pre-determined range of limits) could occur when a change in road pavement occurs (e.g. from a concrete to a macadam surface) and the computer may be programmed to identify such occurrences as errors, or, if the wheel sensor response is slightly varied (as when the change of road surface is angular rather than perpendicular to the direction of travel), then normal countersteering functions could come into play.

Steering correction activity in response to a change in the road surface texture at, for example, the right wheel (such as would occur when said wheel begins to contact the road's shoulder) would be executed in the following manner:

The wheel position data for the interval prior to the onset of change in wheel position, WP(R), are held in variable buffer memory and are accessed appropriate to the current speed of the vehicle (and/or standardized, optimized distance travelled between former and current wheel positions) and are used as a steering correction reference by the computer "A" as previously discussed. One the computer identifies a sensor input sequence as a steering correction task, it prompts the closure of the ACS piston's Pressure Release Valve "E" and the opening of the appropriate ACS System Hydraulic Control valve(s) of component "F", thereby allowing the regulated flow of pressurized hydraulic fluid from the hydraulic pump "G" through the open Hydraulic Shut-off valve(s) "H" to the ACS Hydraulic Piston "I" (or modified power steering component "L"). The sensor input associated with this sequence is monitored in conjunction with the current, right wheel motion/position sensor input WC(R), arising from component "D". The pressurization of the ACS Hydraulic Piston continues until the current wheel position data WC(R) equals or slightly exceeds the WP(R) value, said ACS Hydraulic Piston having thus mechanically corrected or slightly overcorrected the wheel position via the steering linkage "N", this according to program design.

Once WC(R) equals or slightly exceeds the extracted WP(R) value, the computer initiates closure of the ACS Hydraulic Control's piston-pressurizing valve(s) (of component "F") and the opening of the ACS hydraulic piston Pressure Release Valve(s) "E" and the ACS Hydraulic Control's fluid return valve(s) (of component "F"), thereby relinquishing physical control to the vehicle operator's portion of the power steering system.

Although not illustrated in FIG. 2, it may be preferable that all valves and their corresponding status sensors be configured in tandem as an additional safety precaution and in conjunction with self-diagnostic programming and displays to alert the vehicle's operator to component malfunctions as they occur. The ACS Computer, "A", will be programmed to isolate or shut down the system in the event of a failure of any one or more of its' components, as a further precaution. At computer level, the system's commands for valving, the status sensor inputs and the system's responses to those commands, as indicated by the wheel motion/position sensor responses, are all continuously cross-referenced and compared for validity, in both active and passive modes of operation. The ACS System is physically configured to co-exist with the manual power steering system so as to not interfere with normal power steering activity if isolated due to component failure or when operating in it's passive mode. Therefore, if the ACS System is shut down, for whatever reason, steering activity will physically default to a normal, non-ACS operating condition.

Numerous safeguards can be incorporated into the ACS system in order to prevent a system failure from interfering with the operator's physical control over normal steering functions, thereby substantially decreasing the possibility of ACS System failure-related motor vehicle accidents.

The following portion of this disclosure offers examples of means by which the ACS System may be safeguarded against malfunctions, while not being limited exclusively to those means;

Computer-monitored status sensors for each hydraulic valve in the system serve to confirm proper valving status for each of those valves appropriate to each of their functions under both active and passive system operations. In the event of a mechanical failure of any of the hydraulic valves, an inappropriate valve status sensor response would prompt the computer to run routines designed to effect corrective measures expressed in the regulation of the hydraulic flow sequences, so as to isolate the ACS portion of the overall steering system and terminate ACS System intervention in steering functions, thus restoring manual control over said steering functions. Faulty status sensors could similarly be detected, prompting the computer to shut down ACS System participation in the steering process. A faulty status sensor could also be easily detected if two such sensors per monitoring location are employed, conflicting inputs from a pair of such sensors being indicative of a malfunction while identical inputs from said sensors are indicative of normalcy.

At computer level, as soon as the WC value exceeds the WP value beyond a predefined limit, the violation of this limit would be identified by the computer as an error indicative of system malfunction, and ACS System participation would again be terminated. As an additional means for confirmation of said error, (such as if the Hydraulic Control's ACS piston pressurizing valve were to become physically stuck in the "open" position during a steering correction task), the instant that the WP value limits for steering correction are exceeded, the computer can immediately determine, via a comparison of that valve's status sensor input to that of the previously given valve closure command, that an error indicative of system malfunction exists, (said pressurizing valve also having been identified as being "open" when it should be "closed"). Numerous such comparisons of status sensor and wheel sensor signal inputs to current system commands and presumed system status can be so employed and are to be included within the scope and intent of this invention.

The computer, having been programmed to recognize a failure to confirm proper valving status as a system "malfunction" will prompt immediate corrective actions, which, in this case would constitute actuating the closure of the Hydraulic Shut-off Valve(s) "H", the venting of pressurized fluid back to the hydraulic pump's fluid intake via both the ACS Hydraulic Control's depressurizing valve(s) and the ACS piston Pressure Release Valve(s) "E". This plural venting of the pressurized ACS piston fluid will further ensure that manual steering control prevails in the event of mechanical failure of any of the hydraulic valves or system sensors. Furthermore, the ACS System hydraulics are configured so as to provide for passive venting of hydraulic pressure when the system is either in a passive mode or when it is shut down due to malfunctions.

The ACS computer may be programmed to differentiate between wheel sensor signals of shorter duration and lesser intensity as caused by small road defects of short length (such as a pothole or road patch) and wheel sensor signals of longer duration and greater intensity as well as increasing intensity, resulting from an increasing change of wheel position, (such as when, for example, the right front wheel begins to contact the road shoulder and is pulled on with increasing force, as might occur if the vehicle begins to leave the road surface, as when an operator falls asleep while driving, or when a rut is encountered). However, normal countersteering operations may function equally well in either scenario. The ACS computer, A, FIG. 2., can also be programmed to contain an alarm-triggering routine(s) coupled to an audio and/or visual operator-proximate alarm device which may be activated in response to the initiation of a steering correction routine, said routine having been started in response to wheel motion/position sensor signal inputs of the longer duration and intensity type than those produced when small road defects are encountered. This, in conjunction with a corrective countersteering maneuver, could help to awaken a dozing driver before the vehicle leaves the road, thus possibly assisting in the prevention of this type of accident. An additional feature could include the use of a computer resident ignition shutdown routine, which may run for a predetermined period of time once a predefined number of such alarms are produced within a given time interval, thereby preventing a fatigued driver from continuing any further, this being accomplished via an interface with the vehicle engine's computer, electronic ignition, etc.

In another example of system variation, sensor output manipulation can be employed as follows:

each individual wheel sensor may be configured to produce signal outputs directly indicative of current wheel position whereby both leftward and rightward deviations from the reference signal can be distinguished at computer level, the inputs from one wheel motion/position sensor (or a number of such sensors at one wheel) being used to prompt leftward and rightward steering corrections.

In another system variation, the hydraulics portion of the ACS system may be entirely substituted or partially enhanced, by using electrically-driven, vacuum-driven and/or compressed gas-driven driven and/or compressed gas-driven components for purposes of effecting physical manipulation of the steering correction process.

Since the programming of computers is firmly established in, and can be accomplished by one skilled in the art, via the use of a variety of programming languages, techniques, etc., etc., to achieve functionally identical or functionally similar objectives as are set forth in this disclosure, specific examples of actual programming sequences for the ACS System are not cited herein. However, their use in achieving the functions and objectives as disclosed herein, is intended to fall within the scope and intent of this invention.

It is acknowledged that the ACS system may also be adaptable to vehicles having all-wheel or rear-wheel steering capabilities and that such adaptations fall within the scope and intent of this invention. It is further acknowledged that the components needed to construct the ACS System exist in prior art and that the use of these and functionally similar components for purposes of steering correction and skid detection is claimed as part of this unique disclosure.

It is also acknowledged that numerous combinations of sensors, types of sensors, numbers of sensors in use, and possible sensor locations exist, with regard to this disclosure, and that one skilled in the art would be capable of manipulating the various combinations of sensors, their manner of input and the manner in which their inputs are utilized by the computer, as well as of making modifications in the arrangement, configuration and use of the electric, electronic, and hydraulic components. For example: wheel position corrections may be monitored in relation to input from the steering wheel motion/position sensor, rather than in relation to input from a wheel motion/position sensor as cited herein.

One skilled in the art would also be capable of manipulating the configuration and use of computer components, programming sequences and methods, etc., with regard to detection and interpretation of wheel, steering wheel, reference and speed sensor signals to further influence or alter system functions, as well as in the order in which said arrangement, configuration and programming are detailed in this disclosure and such manipulations are hereby claimed.

It is acknowledged that one or more separate speed sensors may be dedicated solely to ACS input and that such modifications also be included within the scope and intent of this present disclosure.

Furthermore, it is acknowledged that the right wheel motion/position sensor may be monitored during a left curve engagement and that the left wheel motion/position sensor may be monitored during a right curve engagement, in order to maximize the responses of the respective wheel sensors, since the physical forces involved may be more exaggerated at those respective sensor locations during said curve engagements, and that such usage be included within the scope and intent of the present invention.

In this disclosure, I have placed emphasis on abstract programming and configurational concepts, rather than on precise, step-by-step descriptions of programming sequences and features of actual construction of the computer and its peripherals. Both fields are firmly established in prior art, and the various facets of this invention fall well within the capabilities of one skilled in the art, to construct a functional device based on the information contained herein.

The ACS System can indeed do for existing power steering systems what anti-lock braking has done for hydraulic brake systems in terms of maintaining driver control over the vehicle, thereby furthering human safety.

What is claimed is:

1. An automatic countersteering system for providing corrective movement of a road vehicle having a pair of steerable wheels and steering linkage associated therewith, in response to changes in the texture of a road, comprising at least one vehicle speed sensor sensitive to the speed of the steerable wheels for producing a first input signal in response to sudden deviations in wheel speed from reference values, at least one wheel position detecting sensor for detecting the lateral wheel movement of the steerable wheels and to produce a second input signal in response to lateral wheel movements, such as movements being indicative of skid movement and/or changes in the texture of the road surface, at least one steering wheel position detecting sensor for sensing the rotational motion of the steering wheel and to produce a third input signal indicative of movement thereof, at least one force producing mechanism for actuating the steerable wheels in accordance with a control signal applied to said mechanism, and a control system connected to said vehicle wheel speed sensor, said wheel position detecting sensor, said steering wheel detection sensor, and said force producing mechanism, said control system being adapted to receive said input signals, to differentiate time lags between occurrances of repetitive signals of at least one of said signals, to produce said control signal in accordance therewith as a corrective routine, and to impress the same on said force producing mechanism thereby actuating the steerable wheels as a corrective turning movement.

2. The countersteering system as defined in claim 1 wherein said control system is adapted to compare said first input signal with said reference value and to effect correction of a current wheel position to an optimum position.

3. The countersteering system as defined in claim 1 wherein said control system is adapted to monitor said input signals within predetermined limitations, to compare either of said input signals applied thereto with data therein representative of said limitations, and to effect inactivation of the countersteering system in the event that said limitations are exceeded.

4. The countersteering system as defined in claim 1 wherein said control system is adapted to identify a steering and a skid corrective routine utilizing time-ordered sensor input signal sequences to determine the respective order of the same.

5. The countersteering system as defined in claim 1 wherein said control system is arranged to differentiate between steering and skid corrective routines utilizing wheel position data in relation to prior wheel position data, and to determine the lateral direction of the corrective wheel movement to be taken.

6. The countersteering system as defined in claim 1 wherein said control system is arranged to differentiate between predetermined short and long duration and intensities of said wheel motion sensor signals, and to distingusish between road surface texture conditions in accordance therewith.

7. The countersteering system as defined in claim 1 including an alarm device, said device being arranged for actuation in response to the initiation of a steering and a skid corrective routine.

8. The countersteering system as defined in claim 1 wherein said control system is arranged to effect a steering corrective routine in conjunction with a change in vehicle speed in response to said input signals.

9. The countersteering system as defined in claim 1 wherein said control system is arranged to commence vehicle shutdown in the event the number of steering and a skid corrective routines exceed a predetermined number.

10. The countersteering system as defined in claim 1 wherein said control system is arranged to differentiate between wheel motion originating from changes in road texture and lateral wheel motion originating from vehicle driver contact with the steering wheel.

11. The countersteering system as defined in claim 1 including at least one dispensing means having friction-producing material, and means for applying the same on at least one of the steerable wheels in response to said control signal during a corrective routine.

12. An automatic countersteering system for providing corrective movement of a road vehicle having a pair of steerable wheels and steering linkage associated therewith, in response to changes in the texture of a road surface, comprising at least one vehicle speed sensor sensitive to the speed of the steerable wheels for producing a first input signal in response to sudden deviations in wheel speed from references values, at least one wheel position detecting sensor for detecting the lateral wheel movement of the steerable wheels and to produce a second input signal in response to lateral wheel movements, such movements being indicative of skid movement and/or changes in the texture of the road surface, at least one steering wheel position detecting sensor for sensing the rotational motion of the steering wheel and to produce a third input signal indicative of movement thereof, at least one force producing mechanism for actuating the steerable wheels in accordance with a control signal applied to said mechanism, and a control system connected to said vehicle wheel speed sensor, said wheel position detecting sensor, said steering wheel detection sensor, and said force producing mechanism, said control system being adapted to receive said input signals and in response thereto to distinguish between the detection of changes in the texture of the road surface during straying of the vehicle off the road and the detection of the degradation of friction between a wheel and the road surface during skidding movement.

13. An automatic countersteering system for providing corrective vehicle movement to a road vehicle having a vehicular engine regulating computer, an antilock braking system computer, an automatic throttle control computer, and a pair of steerable wheels and steering linkages connected therewith, along curves in a roadway in response to changes in road texture, comprising means for sensing the position of the steerable wheels and producing a first signal in accordance therewith, means for sensing the position of the steerable wheels for producing a second signal indicative of the lateral movement thereof, means for sensing the wheel position of the steering wheel for producing a third signal indicative of the movement thereof, and a control system connected to said computers and arranged to receive said signals for effecting downward revision of the speed of the vehicle in conjunction with corrective turning movement thereof.

* * * * *